UNITED STATES PATENT OFFICE.

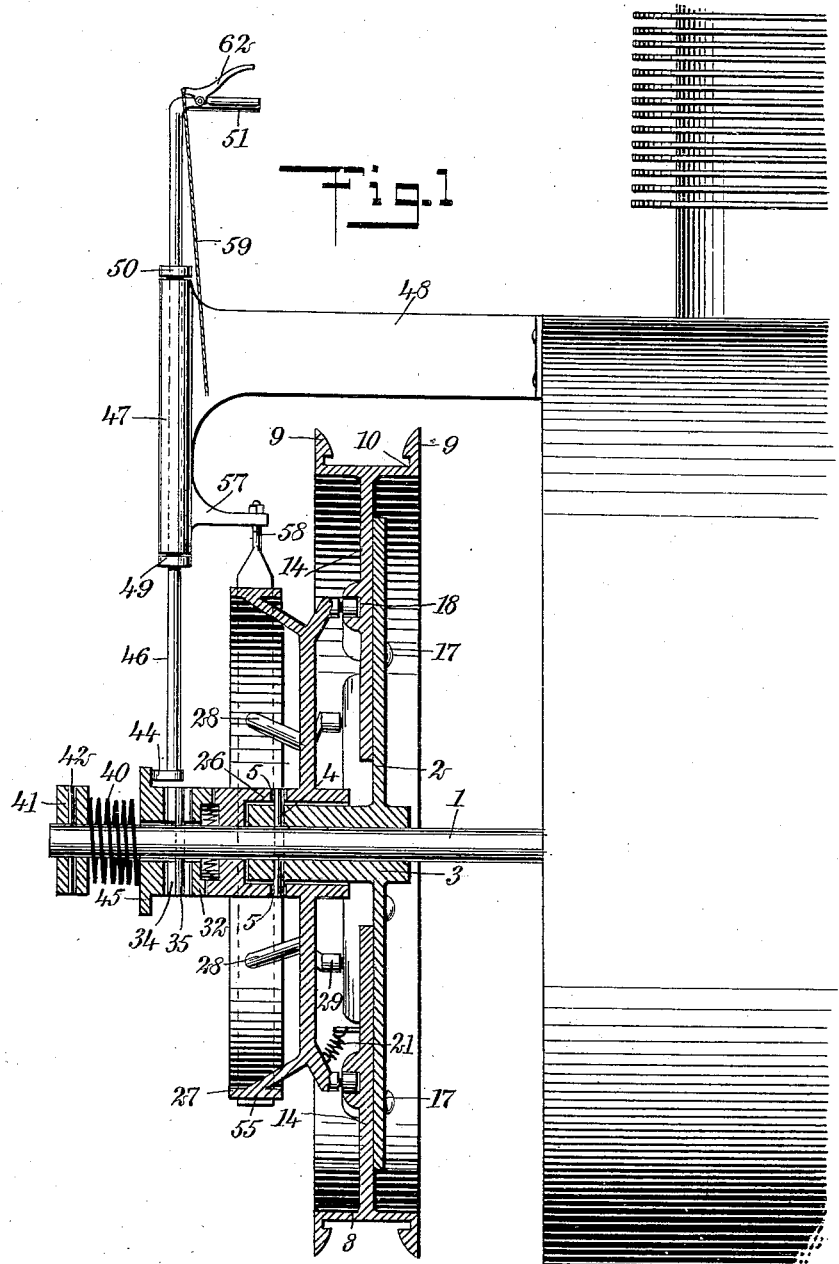

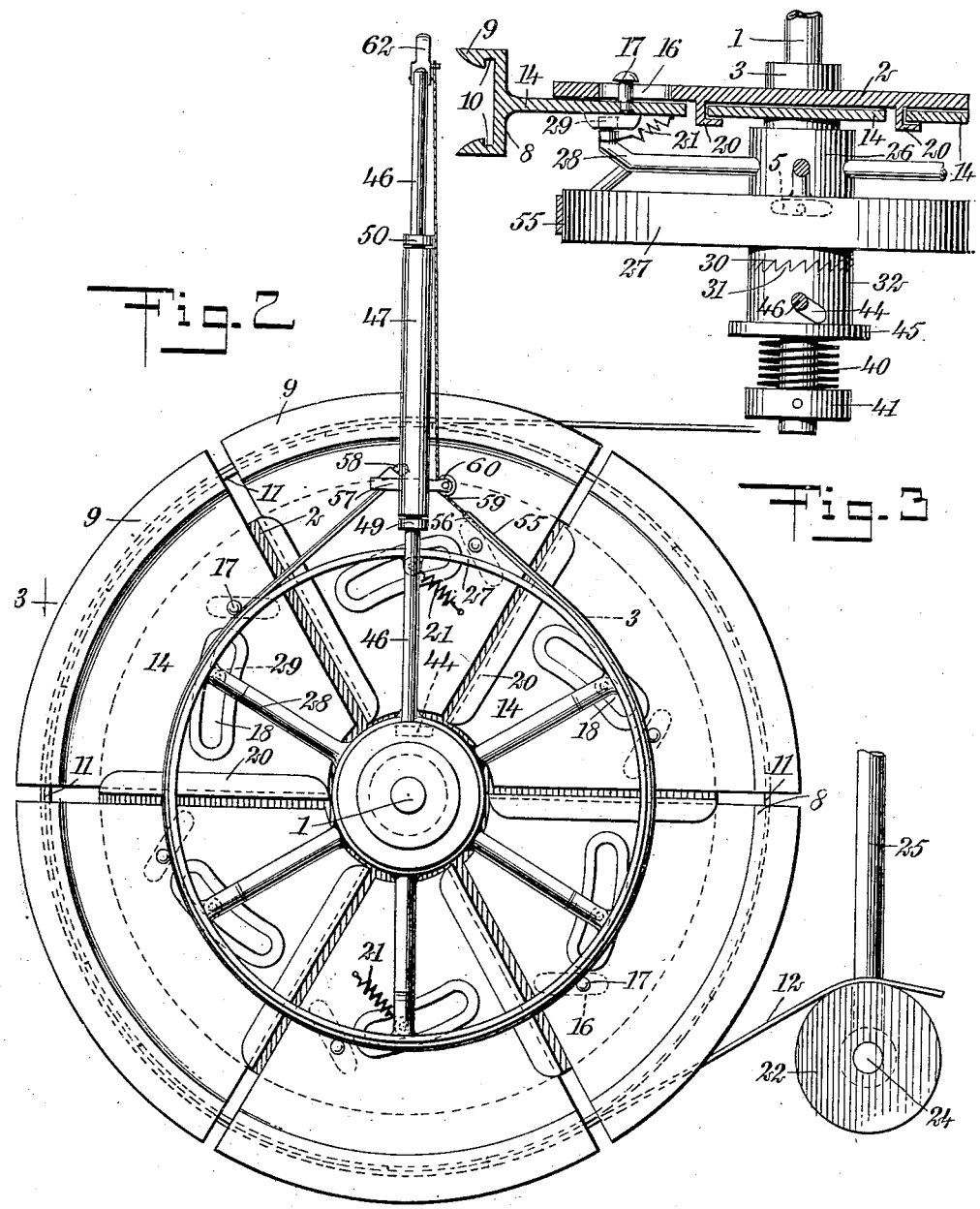

WREN MORROW, OF FREMONT, NEBRASKA.

CHANGEABLE-SPEED GEARING.

No. 914,860.  Specification of Letters Patent.  Patented March 9, 1909.

Application filed November 10, 1908. Serial No. 461,856.

*To all whom it may concern:*

Be it known that I, WREN MORROW, a citizen of the United States, and a resident of the city of Fremont, in the county of Dodge and State of Nebraska, have invented a new and Improved Changeable-Speed Gearing, of which the following is a full, clear, and exact description.

This invention relates to a changeable speed gearing, as used in connection with motor cycles or any other types of machinery where it is desirable to increase or decrease the speed readily while the machine is in motion.

One object of my invention is to provide a changeable speed belt drive, which may be adjusted while the machine is in motion, and one in which the parts are light, durable and simple in construction.

A further object is to provide a changeable speed gearing which may also be utilized as a friction brake. It is often the case in motor cycles when traveling over a long incline that the coaster brake becomes so heated as to be useless, whereupon it is necessary for the rider to use his foot as a brake against the tire of the machine. In my device I am enabled to utilize the same as a friction brake in addition to the function of changing the speed as desired.

In its present embodiment my invention is shown in connection with a motor cycle, but it is to be understood that its use is not in any wise restricted to such a machine.

Reference is to be had to the accompanying drawings forming a part of this specification, in which similar characters of reference indicate corresponding parts in all the views.

Figure 1 is a central vertical section through the speed-changing device, showing parts of the motor cycle in elevation; Fig. 2 is a side elvation of the speed-changing device and an idler for tightening the driving belt; and Fig. 3 is a horizontal section taken on the line 3—3 in Fig. 2.

In said drawings the main or driving shaft 1 is connected to the motor of the cycle in any desired manner. Mounted upon the shaft 1 is a disk 2 having an elongated hub 3 through which a pin 4 may be passed, said pin also passing through the driving shaft 1 in order that the disk and shaft may rotate together.

The driving pulley comprises in the present instance six sections, although it is to be understood that the number may be varied to suit various conditions. Each rim section comprises a sector-shaped ring 8, which is flat on its periphery and has flanges 9 extending along its edges, which may be under-cut at 10, in order to receive the extensions 11 of the rim sections 8 which overlap from one section to another and may be tapered to a thin edge whereby the tread of the wheel is maintained continuous, while the periphery is increased or decreased, as in the operation of changing the speed. Each rim section is provided with an integral web 14 provided with slots 16 through which a bolt or rivet 17 may be passed, to hold the web against the disk 2. Each web 14 is also provided with a spiral slot 18 which is closed at its ends. In order to provide driving means for maintaining the web 14 in proper relation to the disk 2, said disk is provided with a series of radially extending angular flanges 20, which overlap one edge of the web 14 of each rim section.

The driving belt 12 passes over an idler 22 pivoted upon a stud 24 connected with a rod 25 forming part of any suitable style of belt tightener, such as is commonly in use upon machines of this class.

The hub 3 of the disk 2 forms a bearing for the hub 26 of a band wheel 27. Said hub 26 is provided with a pair of circumferential slots 5 for the reception of the ends of the pin 4, thus allowing partial rotation of the hub 26 on the hub 3. Said band wheel is provided with the same number of spokes 28 as there are sections in the driving wheel. Each spoke 28 is provided with a roller 29 pivotally mounted thereon and adapted to move in the spiral slots 18 in the webs 14. The outer end of the hub 26 is provided with teeth 30 adapted to co-act with similar teeth 31 formed upon the inner end of a sleeve 32. Said sleeve is formed with an elongated slot 34 which receives a pin 35 which is fastened to the shaft 1 and co-acts to limit the longitudinal movement of the sleeve 32 and as a means for driving the sleeve and the band wheel 27 when the teeth 30, 31 are in engagement.

Surrounding the shaft 1 is a spiral spring 40 which bears against the outer face of the sleeve 32 and also against a collar 41 fastened to the shaft 1 by means of a pin 42. The spring 40 normally tends to maintain the teeth 30, 31 in engaged position, as clearly seen in Fig. 3.

In order to disengage the teeth 30, 31, I provide a cam 44 which is adapted to bear against a flange 45 on the sleeve 32. Said cam 44 is mounted upon the lower end of a vertical rod 46 which passes through a sleeve 47 formed upon a bracket 48, which may be bolted to the motor frame. The rod 46 is provided with collars 49, 50, to maintain it in proper position in relation to the sleeve 47. The upper end of the rod 46 is bent at right angles to form a handle 51. By rotating the rod 46 by means of the handle 51 the cam 44 may be made to bear against the flange 45 and force the sleeve 32 outwardly, to disengage the teeth 30 and 31. Surrounding the rim of the band wheel 27 is a friction band, which may be composed of a steel strap 55 which is faced with a strip of leather 56, to bear against the periphery of the band wheel. One end of the friction band is attached by means of a bolt 58 to an arm 57 connected to the sleeve 47. The other end of the friction band may be connected to a cable 59 which passes over a pulley 60 supported in the bracket 57. The outer end of the cable 59 is connected to a handle 62 pivoted to the handle 51.

The operation of the device is as follows: When it is desired to increase the diameter of the driving pulley, the handle 51 is turned so that the cam 44 may force the sleeve 32 outwardly, to disengage the teeth 30 and 31. The handle 62 is then pressed downwardly, to tighten the friction band about the band wheel 27, to prevent the rotation of said band wheel. It will be understood that the driving wheel is rotating in a clockwise direction, in which case the rollers 29 will travel in the slots 18, to force the sections of the rim outwardly. As soon as the desired diameter of the driving pulley has been attained the handle 62 is released thus releasing the band wheel 27, and at the same time the handle 51 is turned so as to free the flange 45 from the cam 44, whereupon the spring 40 forces the sleeve 32 longitudinally, to cause the teeth 30 and 31 to become engaged. This locks the device so that the band wheel and the driving pulley rotate in unison with the driving shaft 1. It will be noted that by pushing the handle 62 downwardly when the gearing is in the present condition the band about the band wheel 27 will be tightened, thereby coacting as a friction brake.

In order to reduce the size of the driving pulley it is merely necessary to release the sleeve 32, as already described, whereupon the tension of the driving belt 12 is sufficient to draw the sections of the driving pulley together, whereupon they may be locked by allowing the sleeve 32 to engage the teeth on the band wheel 27, as above described. The springs 21 aid the belt 12 in reducing the size of the driving pulley.

Having thus described my invention, I claim as new and desire to secure by Letters Patent:

1. A changeable speed gearing, comprising a shaft, a sectional pulley fastened to rotate with said shaft, a band wheel mounted to rotate about said shaft, means on said band wheel coöperating with said sectional pulley to move its sections, means to prevent the rotation of said band wheel, whereby when said sectional pulley is rotated with respect to said band wheel the diameter of the former may be varied, and means for causing said band wheel to rotate with said shaft.

2. A changeable speed gearing, comprising a shaft, a sectional pulley fastened to rotate with said shaft, a band wheel mounted to rotate about said shaft, means on said band wheel coöperating with said sectional pulley to move its sections, means to prevent the rotation of said band wheel, whereby when said sectional pulley is rotated with respect to said band wheel the diameter of the former may be varied, and means for maintaining said sectional pulley in its adjusted condition, comprising a clutch engaging said band wheel and slidably mounted on said shaft.

3. A changeable speed gearing, comprising a pulley composed of a plurality of sections, a band wheel operatively connected to each section of said pulley, and means for preventing the rotation of said band wheel, whereby when the said sectional pulley is rotated with respect to said band wheel the diameter of the former may be varied.

4. A changeable speed gearing, comprising a pulley composed of a plurality of sections, a band wheel operatively connected to each section of said pulley, means for preventing the rotation of said band wheel, whereby when said sectional pulley is rotated with respect to said band wheel the diameter of the former may be varied, and means for maintaining said sectional pulley in its adjusted condition.

5. A changeable speed gearing, comprising a pulley having a disk and a plurality of rim sections slidably mounted on said disk and each provided with a spiral slot, a band wheel having members which enter said slots, means for preventing the rotation of said band wheel, whereby when said sectional pulley is rotated with respect to said band wheel the diameter of the former may be varied.

6. A changeable speed gearing, comprising a rotary disk having a plurality of rim sections slidably mounted thereon, each section provided with a spiral slot, a band wheel having members which enter said slots, a friction band coöperating with the periphery of said band wheel, means for tightening said friction band to prevent the rotation of the wheel, whereby when said sectional pulley is rotated with respect to said band wheel the diameter of the former may be varied.

7. A changeable speed gearing, comprising a shaft, a disk mounted to rotate with said shaft, a plurality of rim sections slidably mounted on said disk, a band wheel mounted to rotate about said shaft, means on said wheel coöperating with said rim sections, means for preventing the rotation of said band wheel, and means for connecting said band wheel to rotate with said shaft.

8. A changeable speed gearing, comprising a shaft, a sectional pulley mounted to rotate with said shaft, a band wheel coöperating with said sectional pulley to vary the diameter of the latter, a band passing over said band wheel, means for tightening said band, and means connecting said band wheel to rotate with said shaft.

9. A changeable speed gearing, comprising a shaft, a sectional pulley mounted to rotate with said shaft, a band wheel coöperating with said pulley to vary the diameter of the latter, a band passing over said band wheel, means for tightening said band, and a clutch slidably mounted on said shaft and coöperating to drive said band wheel.

10. A changeable speed gearing, comprising a sectional pulley, a friction brake wheel mounted to rotate with said pulley, means for increasing the friction of said brake, means for freeing it from rotation with said pulley, and connections between said pulley and brake, whereby the diameter of the former may be varied.

In testimony whereof I have signed my name to this specification in the presence of two subscribing witnesses.

WREN MORROW.

Witnesses:
 OTTO H. SCHURMAN,
 JOHN H. CLELAND.